United States Patent
Nahuel-Andrejuk et al.

(10) Patent No.: US 11,059,582 B2
(45) Date of Patent: Jul. 13, 2021

(54) SYSTEMS FOR ACQUIRING FIELD CONDITION DATA

(71) Applicant: CNH Industrial Canada, Ltd., Saskatoon (CA)

(72) Inventors: Nicholas Nahuel-Andrejuk, Normal, IL (US); James W. Henry, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 102 days.

(21) Appl. No.: 16/272,878

(22) Filed: Feb. 11, 2019

(65) Prior Publication Data

US 2020/0255139 A1    Aug. 13, 2020

(51) Int. Cl.
    *B64C 39/02*     (2006.01)
    *G01D 21/02*     (2006.01)
    *G05D 1/10*     (2006.01)

(52) U.S. Cl.
CPC .......... *B64C 39/024* (2013.01); *G01D 21/02* (2013.01); *G05D 1/101* (2013.01); *B64C 2201/12* (2013.01)

(58) Field of Classification Search
CPC .............. B64C 39/024; B64C 2201/00; B64C 2201/126; B64C 2201/12; G05D 1/101; G01D 21/02
See application file for complete search history.

(56) References Cited

U.S. PATENT DOCUMENTS

| | | | |
|---|---|---|---|
| 4,482,021 A | 11/1984 | Repski | |
| 4,994,738 A | 2/1991 | Soyck et al. | |
| 6,061,618 A | 5/2000 | Hale et al. | |
| 6,941,225 B2 | 9/2005 | Upadhyaya et al. | |
| 7,164,117 B2 | 1/2007 | Breed et al. | |
| 7,183,779 B2 | 2/2007 | Hughes | |
| 7,959,104 B2 * | 6/2011 | Kuntz | A63H 33/003 244/2 |
| 9,007,461 B2 | 4/2015 | Ohtomo et al. | |

(Continued)

FOREIGN PATENT DOCUMENTS

| | | |
|---|---|---|
| CN | 104330279 | 2/2015 |
| CN | 108152071 | 2/2015 |

(Continued)

OTHER PUBLICATIONS

Christie, Katherine et al., Unmanned Aircraft Systems in Wildlife Research: Current and Future Applications of a Transformative Technology, The Ecological Society of America, https://pdfs.semanticscholar.org/bc88/a2f3f15a5bb649e71b28ce9910e3adeaab66.pdf, Jun. 1, 2016, 11 pages.

(Continued)

*Primary Examiner* — Tyler J Lee
(74) *Attorney, Agent, or Firm* — Rebecca L. Henkel; Rickard K. DeMille

(57) ABSTRACT

A system for acquiring agricultural data includes a UAV with a controller and a sensing device is provided. In several embodiments, the controller is configured to receive data associated with a data collection point located within the field and control the operation of the UAV such that the UAV is flown over the field and lands in the field at the data collection point. The sensing device, in several embodiments, is configured to capture field condition data associated with the field while the UAV is maintained in a landed condition at the data collection point.

11 Claims, 12 Drawing Sheets

(56) References Cited

U.S. PATENT DOCUMENTS

| | | |
|---|---|---|
| 9,008,924 B2 | 4/2015 | Jackson |
| 9,033,276 B1 | 5/2015 | Calvert |
| 9,064,151 B2 | 6/2015 | Shamir et al. |
| 9,116,078 B1 | 8/2015 | Scheiderer et al. |
| 9,265,187 B2 | 2/2016 | Cavender-Bares et al. |
| 9,327,721 B2 | 5/2016 | Johri et al. |
| 9,350,954 B2 | 5/2016 | Wagreich |
| 9,382,003 B2 | 7/2016 | Burema et al. |
| 9,466,919 B2 | 10/2016 | Kiani et al. |
| 9,499,154 B2 | 11/2016 | Marfatia et al. |
| 9,592,908 B2 * | 3/2017 | Gentry ............... B64C 25/32 |
| 9,609,282 B2 | 3/2017 | Ohtomo et al. |
| 9,745,060 B2 | 8/2017 | O'Connor et al. |
| 9,854,165 B2 | 12/2017 | Wang |
| 9,857,293 B2 | 1/2018 | Zabetakis et al. |
| 9,858,821 B2 | 1/2018 | Ignaczak et al. |
| 9,922,405 B2 | 3/2018 | Sauder et al. |
| 9,924,629 B2 | 3/2018 | Batcheller et al. |
| 9,930,826 B2 | 4/2018 | McCloskey |
| 9,936,631 B1 | 4/2018 | Hubner et al. |
| 9,955,625 B2 | 5/2018 | Baurer et al. |
| 9,994,307 B2 | 6/2018 | Nguyen et al. |
| 10,006,994 B2 | 6/2018 | Chan et al. |
| 10,011,352 B1 | 7/2018 | Dahlstrom |
| 10,026,165 B1 | 7/2018 | Fryshman |
| 10,070,577 B2 | 9/2018 | Cavender-Bares |
| 10,078,784 B2 | 9/2018 | Prouty et al. |
| 10,104,836 B2 | 10/2018 | Jamison |
| 10,296,005 B2 | 5/2019 | Cantrell et al. |
| 10,861,242 B2 | 12/2020 | Lacey et al. |
| 10,863,668 B2 | 12/2020 | Chrysanthakopoulos et al. |
| 2009/0071714 A1 | 3/2009 | Shrestha |
| 2012/0004768 A1 | 1/2012 | Schweitzer et al. |
| 2012/0200703 A1 | 8/2012 | Nadir et al. |
| 2012/0240737 A1 | 9/2012 | Yang et al. |
| 2013/0068892 A1 | 3/2013 | Bin Desa et al. |
| 2013/0306267 A1 | 11/2013 | Feldman et al. |
| 2014/0121910 A1 | 5/2014 | Carr et al. |
| 2014/0312165 A1 | 10/2014 | Mkrtchyan |
| 2016/0144959 A1 | 5/2016 | Meffert |
| 2016/0157414 A1 | 6/2016 | Ackerman et al. |
| 2016/0169772 A1 | 6/2016 | Olmedo et al. |
| 2016/0344981 A1 | 11/2016 | Lunt |
| 2017/0021923 A1 | 1/2017 | Fisher et al. |
| 2017/0021941 A1 | 1/2017 | Fisher et al. |
| 2017/0021942 A1 | 1/2017 | Fisher et al. |
| 2017/0023949 A1 | 1/2017 | Fisher et al. |
| 2017/0042081 A1 | 2/2017 | Zumbach et al. |
| 2017/0080989 A1 * | 3/2017 | Duncan ............... B62D 57/032 |
| 2017/0096222 A1 | 4/2017 | Spinelli et al. |
| 2017/0129605 A1 | 5/2017 | Wu et al. |
| 2017/0152843 A1 | 6/2017 | Bei et al. |
| 2017/0177006 A1 | 6/2017 | Fisher et al. |
| 2017/0178222 A1 * | 6/2017 | High ............... G01N 33/24 |
| 2017/0197714 A1 * | 7/2017 | Golden ............... B60F 5/02 |
| 2017/0247120 A1 * | 8/2017 | Miller ............... B64C 39/024 |
| 2017/0248969 A1 | 8/2017 | Ham et al. |
| 2017/0253330 A1 | 9/2017 | Saigh et al. |
| 2017/0258005 A1 | 9/2017 | Cutter |
| 2017/0274988 A1 * | 9/2017 | Nguyen ............... B64C 25/28 |
| 2017/0291704 A1 | 10/2017 | Alegria |
| 2017/0308099 A1 | 10/2017 | Kim et al. |
| 2017/0313439 A1 * | 11/2017 | Holt ............... B64C 39/024 |
| 2017/0316283 A1 | 11/2017 | Fryshman |
| 2017/0359943 A1 | 12/2017 | Calleija et al. |
| 2017/0372137 A1 | 12/2017 | Kumar et al. |
| 2018/0032042 A1 | 2/2018 | Turpin et al. |
| 2018/0074499 A1 * | 3/2018 | Cantrell ............... G05D 1/0088 |
| 2018/0077918 A1 | 3/2018 | Yu |
| 2018/0099741 A1 * | 4/2018 | Oberndorfer ............ B64C 25/10 |
| 2018/0141644 A1 * | 5/2018 | Waltner ............... B64C 25/32 |
| 2018/0150984 A1 | 5/2018 | Enke |
| 2018/0174290 A1 | 5/2018 | Yoshida et al. |
| 2018/0156770 A1 | 6/2018 | Saez et al. |
| 2018/0237693 A1 | 8/2018 | Li et al. |
| 2019/0017984 A1 * | 1/2019 | Fang ............... B64C 39/024 |
| 2019/0030475 A1 | 1/2019 | Witchey |
| 2019/0031346 A1 | 1/2019 | Yong et al. |
| 2019/0073003 A1 | 3/2019 | Xu et al. |
| 2019/0202554 A1 | 7/2019 | Bosworth |
| 2019/0216009 A1 * | 7/2019 | Stoller ............... A01C 23/047 |
| 2020/0037491 A1 | 2/2020 | Schoeny et al. |
| 2020/0142090 A1 * | 5/2020 | Colombo ............... G01V 3/16 |
| 2020/0155254 A1 | 5/2020 | Sharonov |
| 2020/0170718 A1 | 6/2020 | Peine |
| 2020/0225207 A1 | 7/2020 | Schwindt |
| 2020/0255139 A1 | 8/2020 | Nahuel-Andrejuk et al. |
| 2020/0255140 A1 | 8/2020 | Nahuel-Andrejuk et al. |
| 2020/0257318 A1 | 8/2020 | Nahuel-Andrejuk et al. |
| 2020/0260633 A1 | 8/2020 | Kovach et al. |
| 2020/0260634 A1 | 8/2020 | Kovach et al. |
| 2020/0278696 A1 | 9/2020 | Miller et al. |

FOREIGN PATENT DOCUMENTS

| | | |
|---|---|---|
| CN | 204236769 | 4/2015 |
| CN | 107235146 | 10/2017 |
| CN | 107235746 | 10/2017 |
| CN | 107907365 | 4/2018 |
| CN | 107963214 | 4/2018 |
| GB | 2559580 | 8/2018 |
| KR | 101679764 | 11/2016 |
| KR | 101787660 | 10/2017 |
| WO | WO 2009101331 | 8/2009 |
| WO | WO 2012028386 | 3/2012 |
| WO | WO 2017157863 | 9/2017 |
| WO | WO 2017073310 | 10/2017 |
| WO | WO 2017185378 | 11/2017 |
| WO | WO 2018000399 | 1/2018 |

OTHER PUBLICATIONS

Liu, Tao et al., Evaluation of Seed Emergence Uniformity of Mechanically Sown Wheat with UAV RGB Imagery, Remote Sensing 2017, 9(12), https://www.mdpi.com/2072-4292/9/12/1241/htm, 40 pages.

Rohr, Rachel, Meet the New Drone That Could be a Farmer's Best Friend, Modern Farmer, https://modernfarmer.com/2014/01/precision-hawk/, 9 pages.

\* cited by examiner

SYSTEMS FOR ACQUIRING FIELD CONDITION DATA

FIELD

The present subject matter relates generally to systems and methods for acquiring data associated with field conditions, such as agricultural data, and, more specifically, to systems and methods for acquiring field condition data using an unmanned aerial vehicle.

BACKGROUND

In order to optimize yields, the agricultural industry is heavily reliant upon agricultural data. Historically, given the limited amount of data that was available, farmers often simply assumed that fields were essentially homogeneous across their entire areas. Because of this assumption, farm management was conducted in a way in which agricultural inputs (e.g., tillage, planting, fertilizer application, herbicide application, and other working of soil and crops) were applied at uniform rates over an entire field or set of fields. Technological developments, however, now allow crop production to be optimized by learning and responding to variations in soil conditions, as well as in other properties that commonly exist within any given agricultural field. By varying the inputs applied to a field to compensate for local variations or anomalies within the field, an agricultural producer can optimize crop yield and quality by providing the amount of input needed at a specific site. An additional benefit is the reduction of potential environmental damage or degradation due to, for example, erosion, pesticides, or herbicides. This management technique has become known as precision, site-specific, prescriptive, or spatially variable farming.

Precision farming requires the gathering and processing of data related to site-specific characteristics of an agricultural field. Currently, much of this data must still be gathered manually. This process often involves a farmworker physically going to target locations within the field and gathering samples, making measurements, or performing tests. For example, many tests require a soil sample, which, at present, must be collected by manually driving a soil probe into the soil at a known location and extracting the core at multiple locations. This collection of soil samples, along with many other data collection activities, is often labor-intensive. Because the gathering of data from target locations can be labor-intensive, there is a corresponding tendency to reduce the number of target locations and, thereby, reduce the fidelity of the data being gathered. A degradation in the fidelity of the dataset underpinning precision farming results in a reduction of the efficacy of the approach.

Recently, advancements in unmanned aerial vehicle (UAV) technologies have enabled the integration of UAVs into modern farm management practices. For example, UAVs may be flown across a field to collect field-level data. However, because the data is collected while the UAV is in flight, certain drawbacks exist when collecting data in this manner. For example, expensive equipment (e.g., a high-resolution camera is typically required to capture data while the UAV is in flight, which, in turn, requires further specialized equipment (e.g., powerful computers and/or high-bandwidth communication channels) to process and transmit the captured data. In addition, even when expensive equipment is employed, it is often difficult to capture reliable data during flight that can be subsequently processed to provide useful information to the farmer. Further, due to the current practice of collecting data in-flight, the type of data which may be acquired using an UAV is limited.

Accordingly, improved systems and methods for operating UAVs relative to a field, including the use of such UAVs in capturing data related to the field, would be welcomed in the technology.

BRIEF DESCRIPTION

Aspects and advantages of the invention will be set forth in part in the following description, or may be obvious from the description, or may be teamed through practice of the invention.

In accordance with one embodiment of the present disclosure, a system for acquiring agricultural data is provided. The system includes a UAV which may include a controller configured to control an operation of the UAV such that the UAV is moved relative to a field. The system may also include a sensing device supported by the UAV. The sensing device may be configured to capture data associated with a field condition of the field. The controller may be configured to receive data associated with a data collection point located within the field and control the operation of the UAV such that the UAV is flown over the field and lands in the field at the data collection point. With the UAV landed at the data collection, the sensing device may be configured to capture field condition data associated with the field while the UAV is maintained in a landed condition at the data collection point.

In accordance with another embodiment of the present disclosure, a system for acquiring agricultural data is provided. The system includes a UAV which may include a UAV. The UAV may include a controller configured to control an operation of the UAV such that the UAV is moved relative to a field. The system may include a soil sampling device supported by the UAV. The soil sampling device may be configured to capture a soil sample from the field. The controller may be configured to receive data associated with a data collection point located within the field. The controller may control the operation of the UAV such that the UAV is flown over the field and lands in the field at the data collection point. The controller may control an operation of the soil sampling device such that a soil sample is captured while the UAV is in a landed condition at the data collection point.

In accordance with another embodiment of the present disclosure, a method for acquiring agricultural data using a UAV is provided. The method may include receiving data associated with a data collection point located within a field. The method may also include controlling an operation of the UAV such that the UAV is flown over the field and lands in the field at the data collection point. Additionally, the method may include capturing field condition data associated with the field using a sensing device supported by the UAV. The field condition data may be captured by the sensing device while the UAV is maintained in a landed condition at the data collection point.

In accordance with another embodiment of the present disclosure, a method for acquiring agricultural data using a UAV is provided. The method may include receiving data associated with a data collection point located within a field and controlling an operation of the UAV such that the UAV is flown over the field and lands in the field at the data collection point. The method may also include capturing a soil sample from the field using a soil sampling device supported by the UAV while the UAV is in a landed condition at the data collection point.

In accordance with yet another embodiment of the present disclosure, a method for operating a UAV relative to a field is provided. The method 800 may include determining a desired location within the field to land the UAV. The method may also include controlling an operation of the UAV such that the UAV lands within the field at the desired location. Additionally, the method may include controlling an operation of at least one anchoring device provided in operative association with the UAV such that the at least one anchoring device penetrates through a support surface of the field to anchor the UAV relative to the field at the desired location.

In accordance with another embodiment of the present disclosure, a system for operating UAVs relative to a field is provided. The UAV may include a body and a controller supported on the body. The controller may be configured to control an operation the UAV such that the UAV is moved relative to the field. The UAV may include at least one support element coupled to and extending from the body. The at least one support element may be configured to support the body relative to a support surface of the field when the UAV is in a landed condition on the field. At least one anchoring device may be provided in operative association with the UAV. The at least one anchoring device may be configured to penetrate through the support surface of the field to anchor the UAV relative to the field when the UAV is in the landed condition.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
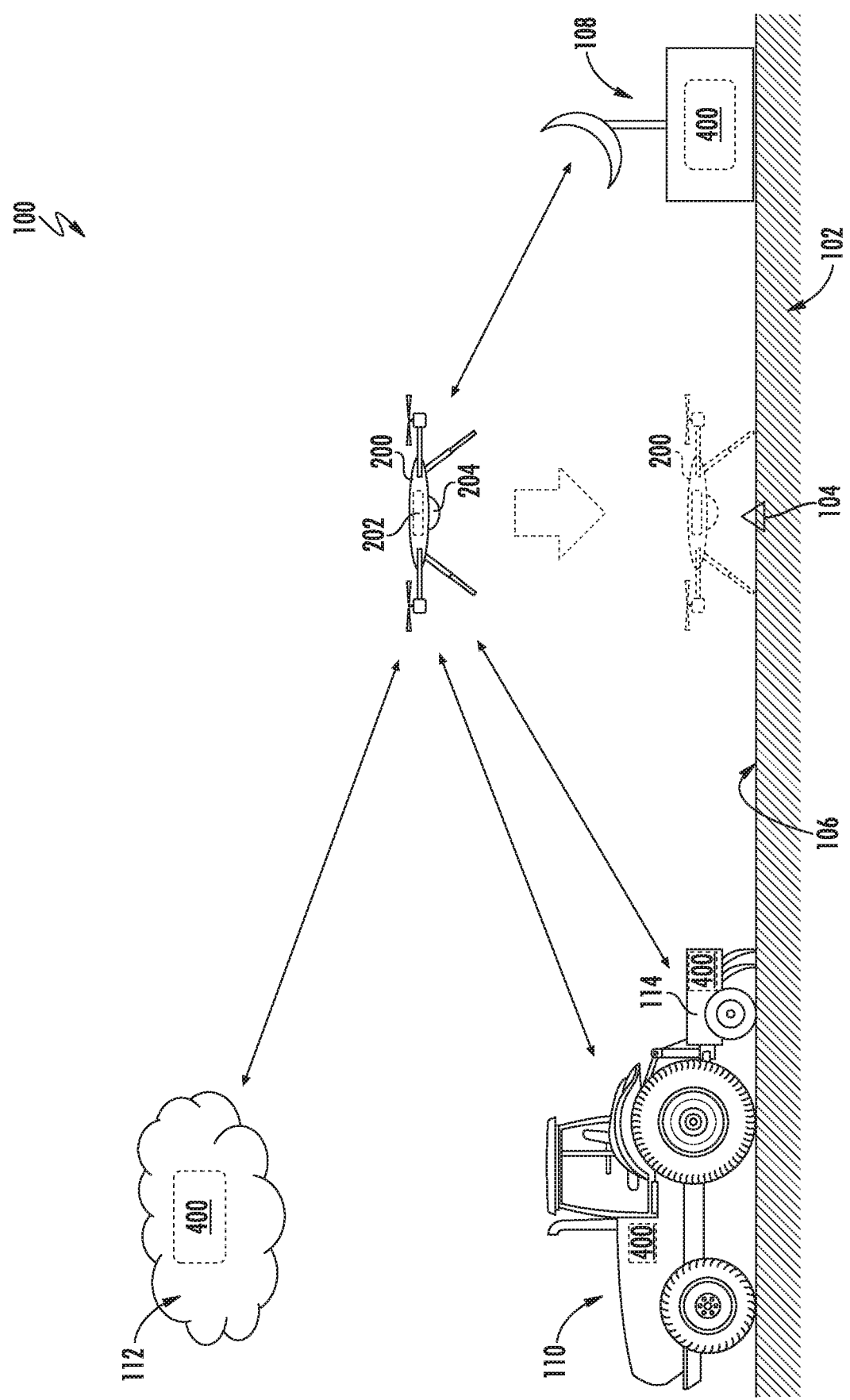
FIG. 1 illustrates an example view of one embodiment of a system for acquiring data related to a field using a UAV in accordance with aspects of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, present subject matter is directed to systems and methods for acquiring data related to a field using an unmanned aerial vehicle (UAV). Additionally, the present subject matter is directed to systems and methods for operating a UAV relative to a field, such as when operating the UAV to collect or acquire agricultural data related to the field. As will be described below, in several embodiments, the disclosed systems and related methods rely on landing the UAV within the field to allow for the acquisition of agricultural data. For example, the operation of the UAV may be controlled such that the UAV is flown across the field and lands at one or more predetermined data collection points defined relative to the field. Once in a landed condition at a given data collection point, one or more sensors provided in operative association with the UAV may be used to capture or acquire data associated with the field at the data collection point. The UAV may then take off from the data collection point and fly to another data collection point for further data acquisition or may return to a home location or base station.

In several embodiments, the UAV may be equipped with one or more non-contact sensors configured to acquire data related to the field at a given data collection point. For instance, in one embodiment, the non-contact sensor(s) may correspond to one or more vision sensors (e.g., a camera(s), LIDAR device(s), etc.), one or more radar sensors, one or more ultrasound sensors, and/or the like configured to capture data related to the field, such as data related to one or more surface features or conditions of the field (e.g., crop residue coverage, the size of clods, surface roughness, and/or the like) and/or data related to one or more subsurface features or conditions of the field (e.g., data related to compaction layers, seedbed floor depth, one or more seed parameters, such as seed spacing seed depth, and/or the like).

In other embodiments, the UAV may be equipped with one or more contact sensors configured to acquire data related to the field at a given data collection point. For instance, in one embodiment, the contact sensor(s) may correspond to one or more soil penetrometers, one or more soil probes, and/or any other suitable sensing device(s) or mechanism(s) configured to acquire data by contacting the field surface or by penetrating through the field surface while the UAV is in a landed condition. In even further embodiments, the UAV may be equipped with a soil sampling device or apparatus, such as soil core sampling device and/or the like. In such embodiments, the soil sampling device may be used to acquire a soil sample from the field while the UAV is in a landed condition.

Moreover, as will be described below, when in the landed condition, the UAV may be supported relative to the field by a plurality of support elements. In such embodiments, the support elements may be configured to support the UAV at a predetermined distance relative to the field. As a result, when using certain types of sensors to collect data from the field (e.g., non-contact sensors), the spacing between the sensor(s) and the field when the UAV is in the landed condition may be known, thereby allowing reliable data to be captured more efficiently. For instance, by supporting the sensor(s) relative to the field at a predetermined distance, a fixed field of view for the sensor(s) may be established, thereby allowing for the use of less expensive, lower resolution sensor(s), which, in turn, may reduce the amount of data be collected and, thus, the computational requirements for transmitting and/or processing the data.

Further, in several embodiments, the UAV may be equipped with at least one anchoring device configured to anchor the UAV relative to the ground when in the landed condition. As will be described below, by anchoring the UAV to the field with anchoring device(s), the UAV may be provided with a more stable platform for data collection. Additionally, such anchoring of the UAV to the field may assist in the deployment of any contact-based sensors or soil sampling devices that must be driven into or otherwise penetrate through the field surface.

Referring now to the drawings, FIG. 1 illustrates an example view of one embodiment of a system 100 for acquiring field condition data relative to a field 102 in accordance with aspects of the present subject matter. As depicted in FIG. 1, the system 100 may generally include an unmanned aerial vehicle (UAV) 200 configured to be flown over the field 102 to allow the UAV 200 to be moved to the location of a given data collection point 104 within the field 102. Thereafter, the UAV may be configured to land within the field at the data collection point and subsequently collect field data or other agricultural data. For instance, as shown in dashed lines in FIG. 1, the UAV 200 may be moved to a landed condition at which a portion of the UAV contacts and is supported by a top or outer surface 106 of the field 102. Field condition data, such as agricultural data, may then be collected by the UAV while in the landed condition.

It should be appreciated that, as described herein, the field 102 may correspond to any suitable field for which data is desired to be collected. For instance, in several embodiments, the field 102 corresponds to an agricultural field. Additionally, in some embodiments, the outer surface 106 of the field 102 may be an exposed soil surface, while in other embodiments, the outer surface 106 may be at least partially defined by another substance covering the soil surface. For example, the outer surface 106 may be at least partially defined by crop residue, harvested crops, water, snow, ice, fabric, or any other covering.

As will be described in greater detail below, the UAV 200 may include a controller 202 and one or more sensing devices 204. In general, the controller 202 may be configured to control the operation of the UAV 200, such as by controlling the propulsion system of the UAV 200 to cause the UAV 200 to be moved relative to the field 102. For instance, in one embodiment, the controller 202 may be configured to receive data associated with one or more predetermined data collection points 104 within the field 102, such as the GPS coordinates of the data collection point(s) 104. The controller 202 may then automatically control the operation of the UAV 200 such that the UAV 200 is flown over the field 102 and lands in the field 102 at the data collection point(s) 104. While in the landed condition at the data collection point 104, the sensing device 204 may then be used to capture desired field condition data associated with the field 102.

It should be appreciated that the UAV 200 may generally correspond to any suitable aerial vehicle capable of unmanned flight, such as any UAV capable of controlled vertical, or nearly vertical, takeoffs and landings. For instance, in the illustrated embodiment, the UAV 200 corresponds to a quadcopter. However, in other embodiments, the UAV 200 may correspond to any other multi-rotor aerial vehicle, such as a tricopter, hexacopter, or octocopter. In still further embodiments, the UAV 200 may be a single-rotor helicopter, or a fixed wing, hybrid vertical takeoff and landing aircraft.

Additionally, as shown in FIG. 1, the system 100 may include one or more remote computing devices 400 separate from the UAV 200. In several embodiments, the remote computing device(s) 400 may be communicatively coupled to the UAV controller 202 (e.g., via a wireless connection) to allow data to be transmitted between the UAV 200 and the remote computing device 400. For instance, the remote computing device(s) 400 may be configured to transmit instructions or data to the UAV controller 202 associated with the location(s) of the desired data collection point(s) 104 within the field 102 and/or the type(s) of data to be collected at each data collection point 104. Similarly, the UAV controller 202 may be configured to transmit or deliver field condition data collected at the data collection point(s) 104 to the remote computing device(s) 400.

It should be appreciated that the remote computing device(s) 400 may correspond to a stand-alone component or may be incorporated into or form part of a separate component or assembly of components. For example, in one embodiment, the remote computing device(s) 400 may form part of a base station 108. In such an embodiment, the base station 108 may be disposed at a fixed location, such as a farm building or central control center, which may be proximal or remote to the field 102, or the base station 108 may be portable, such as by being transportable to a location within or near the field 102. In addition to the base station 108 (or an alternative thereto), the remote computing device(s) 400 may form part of a work vehicle 110 (e.g., the tractor shown in FIG. 1) and/or may form part of an implement 114 (e.g., the tillage implement shown in FIG. 1) configured to be coupled to and/or towed by the work vehicle 110. For instance, the remote computing device(s) 400 may correspond to a vehicle controller provided in operative association with the work vehicle 110 and/or an implement controller provided in operative association with the implement 114. In addition to the base station 108, the work vehicle 110, and/or the implement 114 (or an alternative thereto), the remote computing device(s) 400 may correspond to or form part of a remote cloud-based computing system 112. For instance, as shown in FIG. 1, the remote computing device(s) 400 may correspond to or form part of a cloud computing system 112 located remote to the field 102.

As indicated above, the UAV 200 may be configured to land and collect data at one or more data collection points 104 within the field 102. In general, the location(s) of the data collection point(s) 104 may be selected based on any suitable data collection requirement(s). In some embodiments, the data collection point 104 may be initially received by the remote computing device(s) 400 and subsequently transmitted to the UAV 200. For instance, a human operator associated with the base station 108, the cloud computing system 112, and/or the vehicle/implement 110, 114 may input the desired location(s) of the data collection point(s) 104 into the remote computing device(s) 400. Such input may be based on observed conditions by the operator and/or other relevant data. For instance, an operator of the work vehicle 110 may provide inputs associated with desired locations within the field 102 for data collection points 104 based on field conditions observed or experienced within the field 102 during the performance of an agricultural operation, such as a tillage operation. As another example, an operator may select locations for data collection based on the operator's interpretation of an image of the field or other previously acquired data associated with the field (e.g., data collected during a previous agricultural operation(s)).

Alternatively, the location(s) of the data collection point(s) 104 may be determined or calculated automatically by the remote computing device(s) 400 based on inputs received from one or more sources. For instance, the remote computing device(s) 400 may receive inputs from a variety of sensors associated with the work vehicle 110 and/or the implement 114, as well inputs from the operator of the work vehicle 110 and implement 114 and/or inputs associated with historical or previously collected data for the field 102. Based on such inputs, the remote computing device(s) 400 may determine the desired location(s) for the data collection point(s) 104. For example, the remote computing device(s) 400 may receive sensor data from one or more sensors configured to monitor the operation of the implement 114. In such instance, the sensor data may indicate the location of a potentially undesirable field condition within the field 102, such as the location of a compaction layer within the field 102 or the location at which the crop residue coverage and/or size of clods within the field 102 should be checked or confirmed. Based on such sensor data, the remote computing device(s) 400 determine that additional data should be collected at this location within the field 102. As another example, the remote computing devices) 400 may receive aerial imagery captured of the field 102 and analyze the imagery data to determine if one or more locations within the field 102 require additional investigation. For instance, the aerial imagery may indicate areas where crops are failing to emerge, areas with standing water, and/or other areas of interest within the field 102. Once the location(s) of the data collection point(s) 104 is determined by the remote computing device(s) 400, such location(s) may be transmitted to the UAV controller 202 to allow the UAV 200 to be deployed to the data collection point(s) 104 to acquire the desired data.

It should be appreciated that, in other embodiments, the remote computing device(s) 400 may be configured to analyze any other suitable data for selecting the locations of data collection points 104 within the field 102. For instance, the analyzed data may include rainfall amounts or even the time elapsed since the last data collection in a particular area. As another example, the analyzed data may include data acquired during a previously performed agricultural operation. For example, following a tillage operation in which data was collected associated with crop residue coverage, clod sizing, and/or soil roughness, the remote computing device(s) 400 may select locations within the field at which it is desirable to assess the previously collected tillage data, such as to confirm the accuracy of a measured value for crop residue coverage, clod sizing, and/or soil roughness. Similarly, following a planting operation in which data associated with seed parameters was collected (e.g., seed spacing, planting depth, etc.), the remote computing device(s) 400 may select locations within the field at which it is desirable to assess the previously collected seed data, such as to confirm the accuracy of a measured value for the seed spacing and/or planting depth within the field 102.

Moreover, in accordance with aspects of the present subject matter, the locations of data collection points 104 may be selected in coordination with the performance of an agricultural operation within the field 102. For instance, in one embodiment, data collection points 104 may be selected at locations within the field 102 over which the vehicle/implement 110, 114 have not yet passed during the performance of the operation. In such an embodiment, the UAV 200 may be controlled so as to land at each of these pre-operation data collection points 104 and capture data associated with the field 102. The collected data may then be transmitted to the remote computing device(s) 400 associated with the work vehicle 110 and/or the implement 114, which may then be used to adjust one or more operating parameters of the vehicle 110 and/or implement 114 during the performance of the ongoing agricultural operation. In another exemplary embodiment, data collection points 104 may be selected at locations within the field 102 that have already been processed by the vehicle 110 and implement 114 during the performance of the agricultural operation. In such an embodiment, the UAV 200 may land at the selected data collection point(s) 104 and collect data associated with the effectiveness of the ongoing agricultural operation. The UAV controller 202 may then transmit this post-operation data to the remote computing device(s) 400 associated with the work vehicle 110 and/or the implement 114 to allow suitable adjustments to be made.

As stated previously, the disclosed system 100 may be used to capture agricultural data at a given data collection point 104 while the UAV 200 is maintained in a landed condition at such point 104. In one embodiment, following data acquisition, the collected data may be transmitted by the controller 202 to the remote computing device(s) 400 while the UAV 200 is still operating within the field 102. For example, as indicated above, the collected data may, in one embodiment, be immediately transmitted by the UAV controller 202 to the remote computing devices) 400 associated with the work vehicle 110 and/or the implement 114 to allow the operator to adjust ongoing agricultural operation. Similarly, the collected data may be transmitted from the UAV controller 202 to the cloud computing system 112 and/or to the base station 108 for immediate analysis or storage for later analysis. In yet another embodiment, the collected data may be transmitted to other unmanned systems, enabling specified operations or additional data collection.

As an alternative to transmitting the collected data while the UAV 200 is still operating with the field, the data may be retained by the UAV 200 and subsequently transmitted or downloaded. For example, in one embodiment, the captured data may be retained by the UAV controller 202 until the UAV 200 returns to a remote computing device(s) 400, which may then allow the data to be transmitted or downloaded. Returning to a remote computing device(s) 400 may involve, for example, returning to the base station 108 or to the work vehicle 110. Such an implementation may be desirable, for example, when the UAV controller 202 is only configured to transmit the collected data via a short-range wireless connection or a hard-wired connection. Similarly, when the data collected by the UAV 200 corresponds to a soil or core sample, the UAV 200 may be required to return to a given location, such as the location of the base station 108, to allow the sample to be offloaded.

Figure 2:
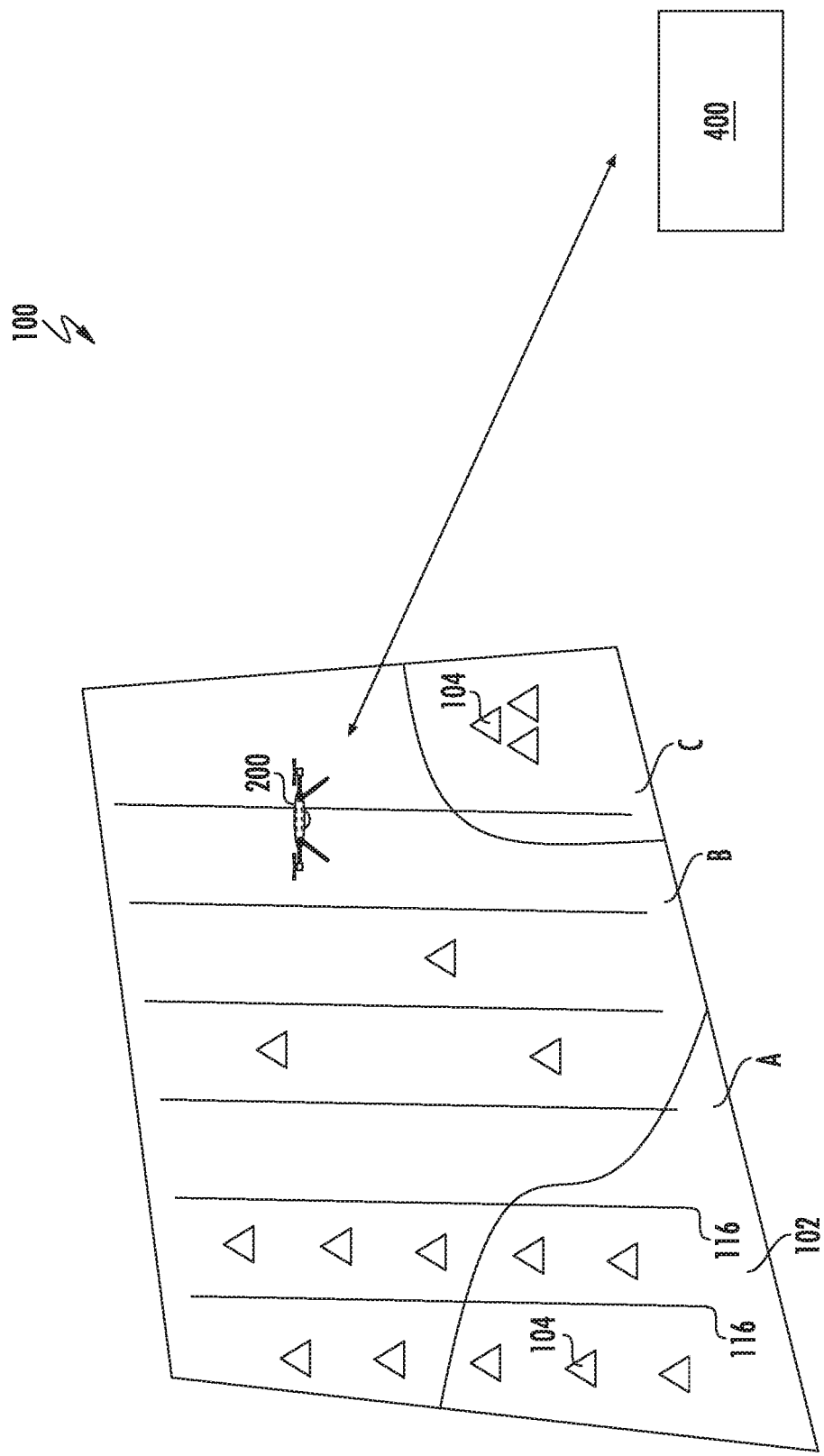
FIG. 2 illustrates an example view of a UAV positioned relative to a field in accordance with aspects of the present subject matter, particularly illustrating example data collection points identified within the field.

Referring now to FIG. 2, a simplified view of a field 102 in which example locations for a plurality of data collection points 104 have been identified is illustrated in accordance with aspects of the present subject matter. In one embodiment, the locations of the data collection points 104 may, as depicted in FIG. 2, be selected based on geography or topography. For example, a plurality of data collection points 104 may be located at or adjacent to the location of one or more features 116 within the field 102, such as by aligning the data collection points 104 relative to locations of furrows or tillage passes within the field 102. In another embodiment, the field 102 may be divided into a plurality of segments or zones, with at least one data collection point 104 located within each segment or zone. For instance, as shown in FIG. 2, the field 102 may be divided into zones, (e.g., A, B, and C) based on topography or other field conditions, and a plurality of the data collection points 104 may be included within each zone. It should be appreciated that, when the selected locations are geographically or topographically based, the data collection points 104 may be evenly distributed, randomly distributed, or clustered around particular locales.

Figure 3:
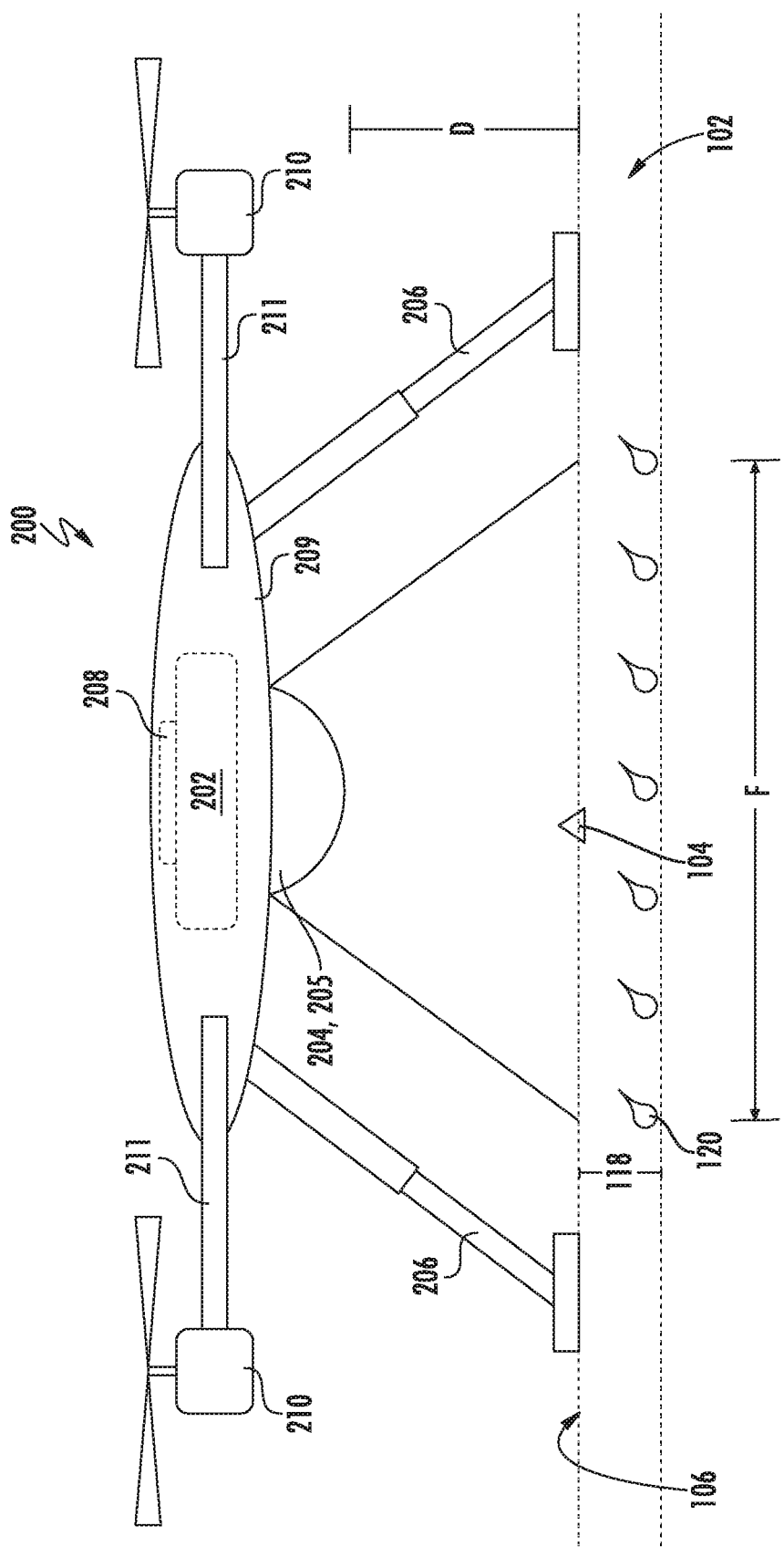
FIG. 3 illustrates an example view of one embodiment of a UAV in a landed condition relative to a portion of a field to allow the UAV to capture data at an adjacent data collection point within the field in accordance with aspects of the present subject matter, particularly illustrating the UAV including a non-contact sensor for acquiring data at the data collection point while in the landed condition.

Referring now to FIG. 3, an example view of the UAV 200 described above with reference to FIG. 1 is illustrated in accordance with aspects of the present subject matter, particularly illustrating the UAV 200 in a landed state relative to the field 102 at the location of a given data collection point 104. As indicated above, the UAV 200 may include a controller 202 configured to control the operation of the UAV 200 and one or more sensing devices 204 for collecting data associated with the field 102 at the data collection point 104 while the UAV 200 is in the landed state. As shown in FIG. 3, in several embodiments, the sensing device(s) 204 may be one or more non-contact-based sensors 205 supported by the UAV 200. In general, the non-contact-based sensor(s) 205 may correspond to any suitable sensor(s) or sensing device(s) configured to capture data associated with the field 102 without requiring the sensor(s) 205 to contact the field 102, such as when the sensor(s) 205 is located above the outer surface 106 of the field 102. For instance, in one embodiment, the non-contact-based sensor(s) 205 may be one or more vision sensors. Suitable vision sensors may include, for example, any sensor designed to detect in the ultraviolet to infrared portions of the electromagnetic spectrum, including visible light. For instance, the vision sensor(s) may be one or more cameras (including stereo cameras) and/or one or more LIDAR devices. Alternatively, the non-contact-based sensor(s) 205 may correspond to any other suitable sensor(s) and/or sensing device(s), such as one or more ultrasonic sensors and/or one or more radar sensors.

The sensing device(s) 204, when configured as a non-contact-based sensor(s) 205, may be utilized within the disclosed system 100 to capture various different types of field condition data while the UAV 200 is maintained in a landed condition at the data collection point 104. For example, in one embodiment, the non-contact-based sensor(s) 205 may be used to capture data associated with a condition(s) of the surface 106 of the field 102. For example, surface conditions that may be detected using the non-contact-based sensor(s) 205 may include, but are not limited to, residue coverage, clod sizing, surface roughness, an emergence parameter associated with plants within the field 102, and/or the like. In addition to detecting surface conditions (or as an alternative thereto), the non-contact-based sensor(s) 205 may be used to capture data associated with a sub-surface condition(s) of the field 102. For example, sub-surface conditions that may be detected using the non-contact-based sensor(s) 205 may include, but are not limited to, seedbed conditions (e.g., a depth 118 of the seedbed or the seedbed roughness), parameters associated with seeds 120 planted within the field 102 (e.g., planting depth, seed spacing, etc.), soil layer conditions (e.g., the depth and/or size of compaction layers), and/or the like. In a further embodiment, the field condition data captured by the non-contact-based sensor(s) 205 may correspond to a soil quality parameter. The soil quality parameter may, for example, be a parameter related to moisture content, nitrogen content, soil pH, or any other parameter related to the fertility of the soil.

It should be appreciated that the particular field condition for which data is to be captured may drive the selection of a particular sensing device(s) 204, 205 and, at least in one embodiment of the system 100, the sensing device(s) 204, 205 carried by the UAV 200 may be swappable or interchangeable with other sensing devices 204, 205. For instance, it may be desirable to utilize a vision-based sensor to capture surface condition data while it may be desirable to use a radar sensor to capture sub-surface condition data. In such instance, the sensing device(s) 204, 205 carried by the UAV 200 may be swapped, when necessary, to allow the desired data to be captured. Alternatively, the UAV 200 may be configured to carry multiple types of sensing device(s) 204, 205 to allow for differing types of field condition data to be captured at a given data collection point(s) 104.

As shown in FIG. 3, the UAV 200 may also include various other components for allowing the UAV 200 to be flown relative to the field 102 and land at or adjacent to a given data collection point 104 within the field 102. For instance, the UAV 200 may include a UAV base or body 209 configured to support a propulsion system 210 (e.g., via arms 211 extending from the body 209), with the operation of the propulsion system 210 configured to be controlled by the UAV controller 202. The propulsion system 210 may generally have any suitable configuration and/or may include any suitable components (e.g., motors, propellers, etc.) that allow the UAV 200 to be flown and landed relative to the field 102. In addition the UAV 200 may include one or more support elements 206 extending outwardly from the UAV body 209 that are configured to support the UAV 200 relative to the field 102. In general, the support element(s) 206 may correspond to any suitable support member(s) suitable for supporting the UAV 200 in a landed state at the data collection point 104, such as legs, a landing ring, skids, wheels, and/or the like. For instance, in the illustrated embodiment, the support element(s) 206 are configured as a plurality of legs (e.g., three or more legs only two of which are shown in FIG. 3) extending outwardly from the UAV body 209 to allow the UAV 200 to be supported in a landed state relative to the field.

In one embodiment, one or more of the support elements 206 may be actuatable to adjust an orientation of the UAV 200 relative to the surface 106 of the field 102. For instance, as shown in FIG. 3, the support elements 206 may correspond to telescoping legs. In such an embodiment, each support element 206 may be actuated by extended or retracting the telescoping portion of the support element 206 relative to the UAV body 209. Alternatively, the support elements 206 may be actuatable in a manner that allows the orientation of the support elements 206 relative to the UAV body 209 (e.g., the angle at which the support elements 206 extend from the body 209) to be adjusted. Such adjustability may allow for the orientation of the UAV 200 with regard to the surface 106 of the field 102 to be adjusted to account for variations therein.

Additionally, in several embodiments, the UAV 200 may be equipped with a level sensor 208 to monitor the orientation of the UAV 200 relative to the field 102 and to facilitate adjustments of the relative orientation, when desired. For example, the level sensor 208 may correspond to a gyroscope, inclinometer, and/or any other suitable sensor(s) that provides an indication of the orientation of the UAV 200. In one embodiment, the orientation data captured by the level sensor 208 may be transmitted to the UAV controller 202 for use in adjusting the orientation of the UAV 200. For instance, the controller 202 may use the data received from the level sensor 208 to control the actuation of one or more of the support elements 206 to adjust the orientation of the UAV 200 relative to the surface 106 of the field 102.

Moreover, in several embodiments, the support elements 206 may be configured to support the UAV 200 above the surface 106 of the field 102 such that the sensing device 204, 205 is located at a predetermined distance D from the surface 106. Such support of the sensing device 204, 205 relative to the field surface 106 may establish a fixed field of vision F for the sensor 204, 205. In one embodiment, the predetermined distance D may be selected so as to provide a desired focal length for the sensor(s) 204, 205 or to ensure that a desired area is covered by the field of view F of the sensor(s) 204, 205. It should be appreciated that, by establishing a fixed field of vision F and/or by knowing the distance D between the sensor(s) 204, 205 and the field surface 106, the number of variables that must be accounted for when analyzing the data may be reduced. Such a reduction in the number of variables may allow for higher fidelity results from relatively basic sensors. For example, in an embodiment wherein the sensing device 204, 205 is a camera, the known distance D enables the utilization of a camera which may have a fixed, shallow focal length. This, in combination with the known field of vision F, allows the capture of field condition data, such as clod size, with a lower-resolution camera. The use of a lower-resolution sensing device 204, 205 to capture the field condition data, in turn, reduces the overall bandwidth requirement, processing power requirement, or both of the system components.

In addition, further enhancements in the quality or fidelity of the field condition data captured by the sensing device 204, 205 may be achieved by reducing the effects of vibration on the sensing device 204, 205. As indicated above, the capturing of the field condition data by the sensing device 204, 205 occurs while the UAV 200 is in a landed state at the data collection point 104. Because the UAV 200 is not airborne at the time of collection, the controller 202 may direct the propulsion system 210 of the UAV 200 to turn off. The elimination of any vibrations caused by the propulsion system 210 may allow for higher fidelity data collection without a corresponding increase in the complexity of the sensing device 204, 205 (e.g., without the need for image stabilization technologies).

Figure 4:
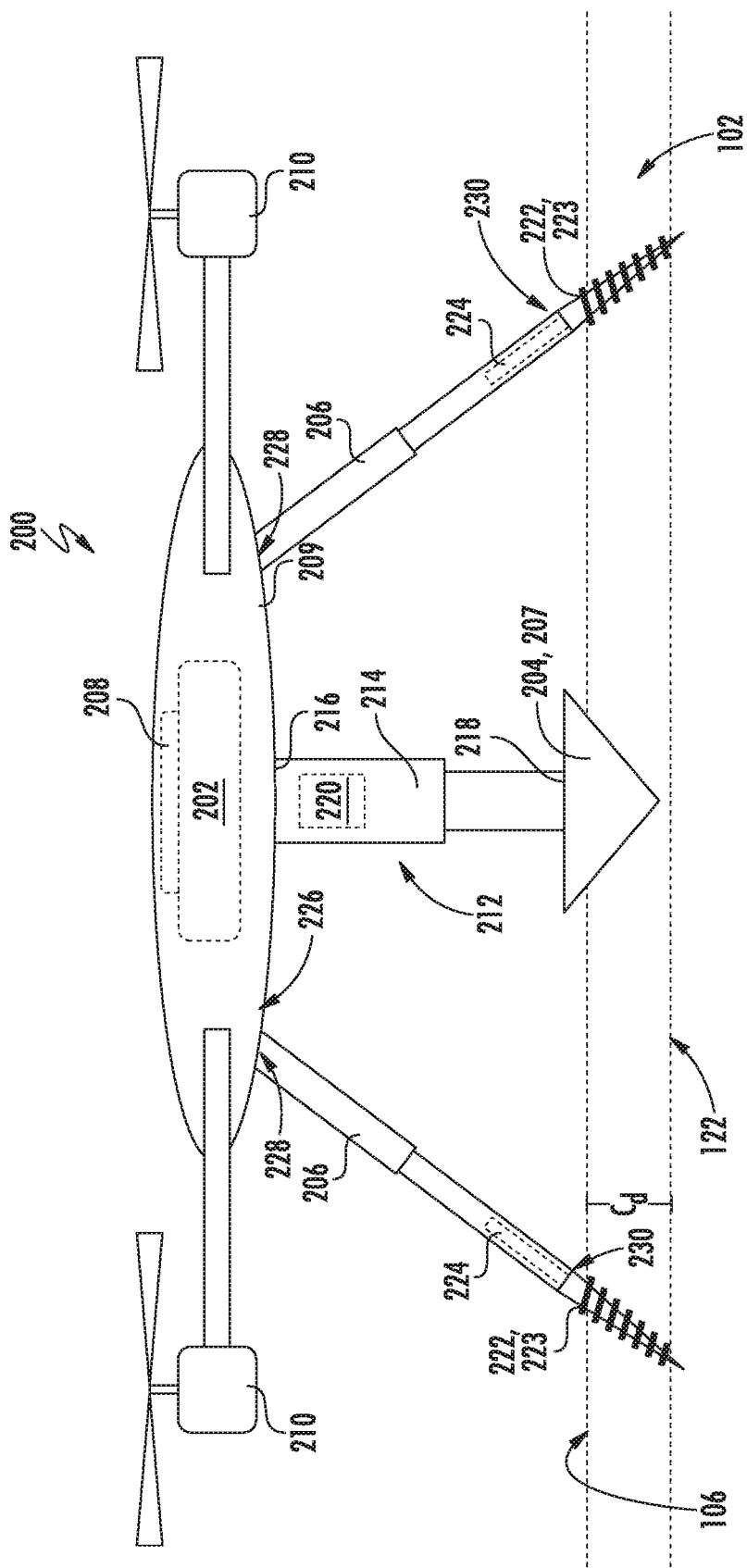
FIG. 4 illustrates another example view of one embodiment of a UAV in a landed condition relative to a portion of a field to allow the UAV to capture data at an adjacent data collection point within the field in accordance with aspects of the present subject matter, particularly illustrating the UAV including a contact sensor for acquiring data at the data collection point while in the landed condition.

Referring now to FIG. 4, another example view of the UAV 200 described above with reference to FIG. 1 is illustrated in accordance with aspects of the present subject matter, particularly illustrating the UAV 200 in a landed state relative to the field 102 at the location of a given data collection point 104. As shown, the UAV 200 generally includes the same or similar components as those described above with reference to the embodiment shown in FIG. 3. Specifically, the UAV 200 includes a controller 202 configured to control the operation of the UAV 200 and one or more sensing devices 204 for collecting data associated with the field 102 at the data collection point 104 while the UAV 200 is in the landed state. Additionally, the UAV 200 includes a propulsion system 210 supported relative to a body 209 of the UAV 200 and one or more support elements 206 extending outwardly from the body 209 to support the UAV 200 relative to the surface 106 of the field 102.

As shown in FIG. 4, unlike the non-contact-based sensor 205 described above, the sensing device(s) 204 corresponds to one or more contact-based sensors 207 supported by the UAV body 209. In several embodiments, the contact-based sensor(s) 207 may form part of a sensor assembly 212 that is configured to contact and/or penetrate through the outer surface 106 of the field 102 to allow field condition data to be captured by the sensor(s) 207. In such embodiments, the sensor assembly 212 may, for example, include a support arm 214 having a first end 216 coupled to the UAV body 209 and an opposed second end 218 coupled to the sensing device(s) 204, 207. The sensor assembly 212 may also include a sensor actuator 220 provided in operative association with the support arm 214. In one embodiment, the UAV controller 202 may activate the sensor actuator 220 to extend the sensor assembly 212 so as to bring the sensing device 204, 207 into contact with and/or penetrate through the surface 106 of the field 102. In addition to linear actuation of the sensing device 204, 207 (or as an alternative thereto), the sensor actuator 220 may be configured to rotate the sensing device 204, 207 relative to the field 102 to drill the sensor 204, 207 into the surface 106 of the field 102. In another embodiment, the support arm 214 may have a fixed length or be non-extendible. In such an embodiment, the sensing device 204, 207 may, for example, be brought into contact with the surface 106 of the field 102 upon landing of the UAV 200.

In general, the contact-based sensor(s) 207 may correspond to any suitable sensor(s) or sensing device(s) configured to capture data associated with the field 102 while the sensor(s) 207 is in contact with the field. As shown in the illustrated embodiment, the contact-based sensor(s) 207 may correspond to a soil penetrometer. When configured as a soil penetrometer, the sensing device 204, 207 may be configured to capture field condition data based at least in part on the amount of force exerted by the sensor assembly 212 as the penetrometer penetrates through the surface 106 of the field 102. In another embodiment, the contact-based sensor(s) 207 may correspond to a soil probe. When configured as a soil probe, the sensing device(s) 204, 207 may be configured to capture field condition data based on, for example, variations in an electrical current or other electromagnetic characteristic. For example, a probe-type sensing device 204, 207 may be configured as a looped or closed-circuit rod. In such a configuration, the controller 202 may measure the time for a voltage pulse to travel the length of the looped or closed-circuit rod to determine apparent permittivity. Alternatively, the contact-based sensor(s) 207 may correspond to any other suitable sensor(s) and/or sensing device(s), such as one or more ultrasonic sensors and/or one or more radar sensors.

The sensing device(s) 204, when configured as a contact-based sensor(s) 207, may be utilized within the disclosed system 100 to capture various different types of field condition data while the UAV 200 is maintained in a landed condition at the data collection point 104. For example, in one embodiment, the contact-based sensor(s) 207 may be used to capture data associated with a sub-surface condition of the field 102 including, but not limited to, seedbed conditions, seed parameters, soil layer conditions (e.g., the depth and/or size of compaction layers), and/or the like. For instance, as shown in FIG. 4, the contact-based sensor(s) 207 may detect the presence of a compaction layer 122 and/or the depth $C_d$ of the compaction layer 122. In addition, the contact-based sensor(s) 207 may also be used to capture data associated with a soil quality parameter, such as moisture content, nitrogen content, soil pH, or any other parameter related to the fertility the soil.

Moreover, as shown in FIG. 4, accordance with aspects of the present disclosure, the UAV 200 100 may, in several embodiments, include one or more anchoring devices 222. For example, in the illustrated embodiment, the UAV 200 includes an anchoring device 222 provided in operative association with each support element 206, such as by mounting or positioning each anchoring device 222 at a distal end 230 of its respective support element 206 opposite a proximal end 228 positioned adjacent to the body 209 of the UAV 200. In general, each anchoring device 222 may be configured to penetrate through the surface 106 of the field 102 to anchor the UAV 200 relative to the field 102, thereby maintaining the UAV 200 in its landed condition. In one embodiment, each anchoring device 222 may be configured to be rotated relative to the surface 106 to allow the anchoring device 222 to penetrate through the surface 106 and anchor the UAV relative to the field 102. For example, the rotatable anchoring device 223 may be configured as an auger-type anchoring device. In order to rotationally drive the anchoring devices 222 relative to the field 102, each anchoring device 222 may be operatively coupled to a rotational actuator 224 (e.g., an electric motor). In such an embodiment, the controller 202 may be configured to control the operation of the rotational actuator 224 such that the rotational actuator 224 rotationally drives its respective anchoring device 222 in a manner that causes the anchoring device 222 to penetrate through the surface 106 to a given depth within the field 102, thereby allowing the UAV 200 to be anchored relative to the field 102. It should be appreciated that, although each rotational actuator 224 is shown in FIG. 4 as being contained within a respective support element 206, it should be appreciated that the rotational actuator 224 may also be supported by the UAV body 209 or the anchoring device 222 itself.

In several embodiments, the anchoring of the UAV 200 relative to the field 102 may include the establishment of a connection or coupling between the UAV 200 and the field 102 of sufficient strength to resist any reactive force developed by the UAV 200 during the deployment of the sensor assembly 212. In other words, as the controller 202 directs the deployment of the sensor assembly 212 into contact with the ground, an upward reactive force will be generated. In some instances, the weight of the UAV 200 may be insufficient to resist the resultant reactive force, thus causing the UAV 200 to lift from the surface 106 rather than properly deploying the sensing device 204. As a result, the anchoring devices 222 may be used to provide a sufficient holding force to maintain the UAV 200 in position relative to the field 102 as the sensor assembly 212 contacts and/or penetrates through the field surface 106.

As discussed above with reference to FIG. 3, in some embodiments, it may be desirable to establish the UAV 200 in a specified orientation, which may, for example be a level orientation relative to the surface 106. As such, similar to the embodiment described above, the UAV 200 may be equipped with a level sensor 208 communicatively coupled to the controller 202. In such an embodiment, t the controller 202 may use the sensor data received from the level sensor 208 to establish the specified orientation of the UAV 200 relative to the surface 106. Additionally, in embodiments in which the anchoring devices 222 are coupled to the distal ends 230 of the support element 206, the controller 202 may control the operation of one or more of the rotational actuators 224 to adjust the orientation of the UAV 200, as necessary or as desired, such as by driving the anchoring device 222 further below the surface 106 to decrease the distance defined between a portion of the UAV body 209 and the surface 106 or by backing out or extracting a portion of the anchoring device 222 from the field 102 to increase the distance between a portion of the UAV body 209 and the surface 106. Moreover, in embodiments where the support elements 206 are actuatable, the controller 202 may use a combination of the actuation of one or more support elements 206 and adjustments to the depth(s) of the anchoring device(s) 222 to modify the attitude or orientation of the UAV 200.

Figure 5:
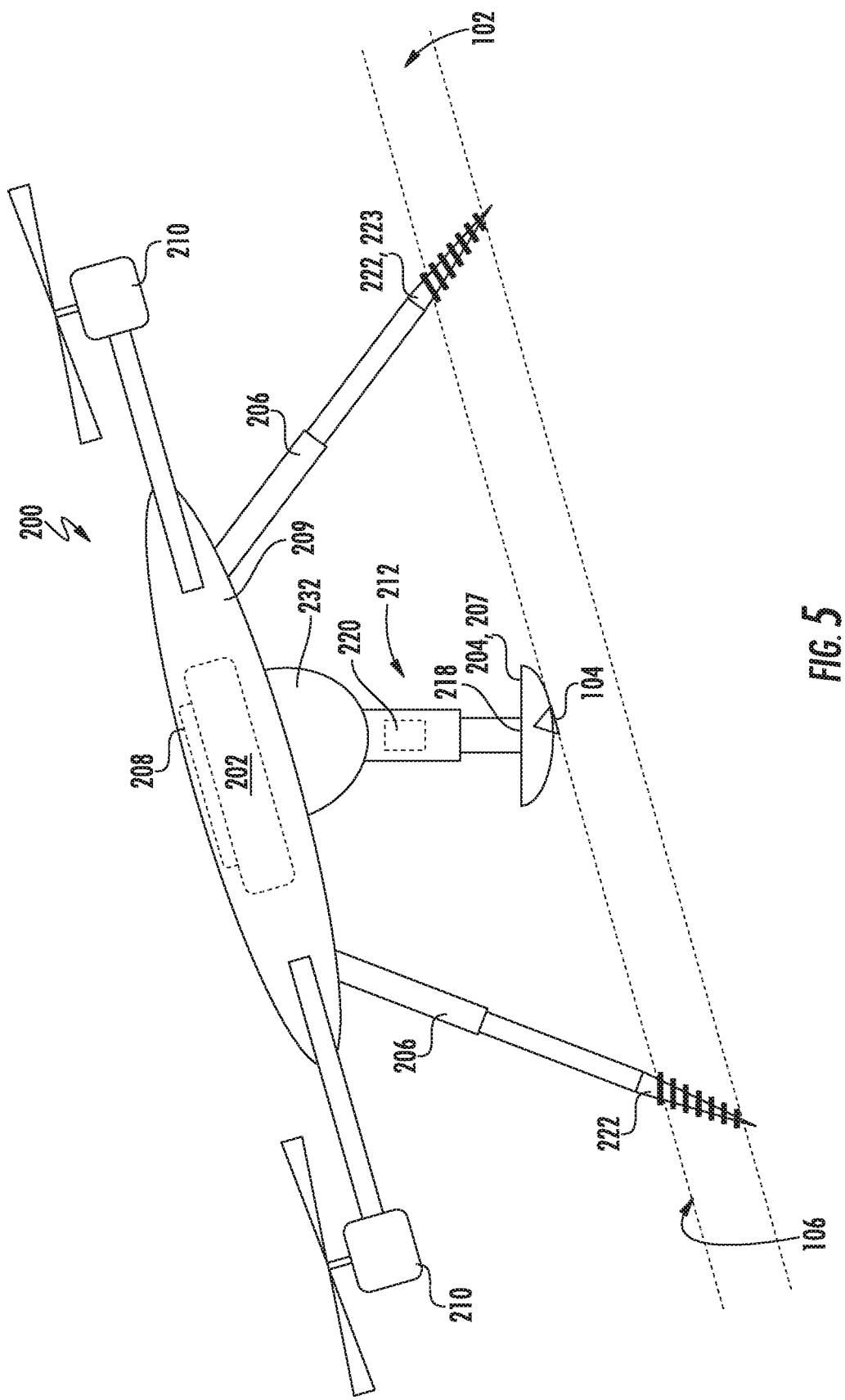
FIG. 5 illustrates yet another example view of one embodiment of a UAV in a landed condition relative to a non-level or sloped portion of a field to allow the UAV to capture data at an adjacent data collection point within the field in accordance with aspects of the present subject matter, particularly illustrating the UAV including a contact sensor for acquiring data at the data collection point while in the landed condition.

Referring now to FIG. 5, an example view of another embodiment of the UAV 200 shown in FIG. 4 is illustrated in accordance with aspects of the present subject matter, particularly illustrating the UAV 200 in a landed state relative to a sloped portion of the field 102. In general, the UAV 200 is configured similarly to that described above with reference to FIG. 4. However, as shown in FIG. 5, the UAV 200 may be equipped with a gimbal 232 for coupling the sensor assembly 212 to the UAV body 209. In such an embodiment, the controller 202 may direct the UAV 200 to land at a data collection point 104 which has a topography exceeding the capability of the UAV 200 to level itself (e.g., by actuating one or more of the support elements 206 and/or by rotationally driving one or more of the anchoring devices 222). The inclusion of the gimbal 232 may enable the UAV 200 to be landed in an out-of-level orientation while the sensor assembly 212 assumes a plumb orientation due to the effects of gravity. For example, the data collection point 104 may be positioned on a topographical feature of the field 102, such as a hillside. The UAV 200 may be landed at the data collection point 104 and anchored to the field. Because the gimbal 232 may allow the sensor assembly 212 to move in response to gravitational forces, the sensor assembly 212 may assume a vertical orientation, despite the UAV 200 being anchored to a hillside. With the sensor assembly 212 in a vertical orientation, the sensing device 204 may be brought into contact with the surface 106. As an alternative to a passive-type gimbal, the gimbal 232 may correspond to an actively controlled gimbal 232 that can be actuated as desired to position the sensor assembly 212 in any suitable orientation relative to the field surface 106.

It should be appreciated that, although FIG. 5 illustrates the use of a gimbal 232 in association with a contact-based sensor assembly 212, the gimbal 232 may also be used with other sensing devices. For instance, a gimbal 232 may also be used in association with the non-contact based sensor(s) 205 described above with reference to FIG. 3 to enable the orientation of the sensor(s) 205 to be adjusted and/or controlled.

Figure 6:
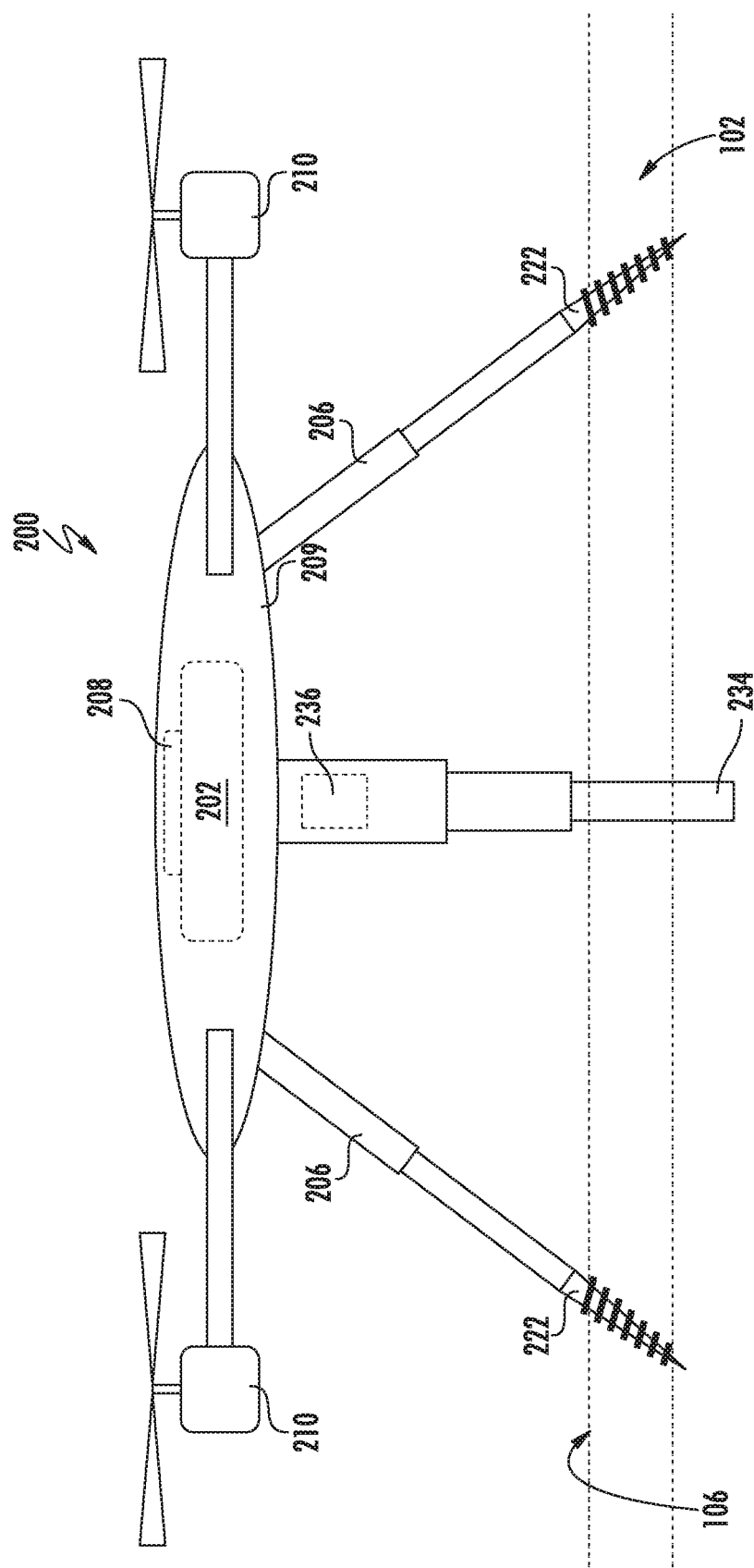
FIG. 6 illustrates another example view of one embodiment of a UAV in a landed condition relative to a portion of a field to allow the UAV to capture data at an adjacent data collection point within the field in accordance with aspects of the present subject matter, particularly illustrating the UAV including a soil sampling mechanism for acquiring data at the data collection point while in the landed condition.

Referring now to FIG. 6, another example view of a further embodiment of the UAV 200 shown in FIG. 4 is illustrated in accordance with aspects of the present subject matter, particularly illustrating the UAV 200 in a landed state relative to the field 102. In general, the UAV 200 is configured similarly to that described above with reference to FIG. 4. However, as shown in FIG. 6, as opposed to the contact-based sensor assembly 212, the UAV 200 includes a soil sampling device 234 supported by the UAV body 209. In such an embodiment, the soil sampling device 234 may correspond to any apparatus suitable for procuring a soil sample from the field 102. For example, the sampling device 234 may be a soil core sample (e.g., a split soil core sampler or multistage soil core sampler), or a coring auger. Regardless, the soil sampling device 234 may capture a soil sample from the field 102 while the UAV 200 is in a landed condition at the data collection point 104. The UAV 200 may be secured in the landed condition at the data collection point 104 by the anchoring devices 222. Specifically, the anchoring devices 222 may be rotationally drive so as to penetrate through the surface 106 of the field 102 to anchor the UAV 200 relative to the field 102 as the soil sampling device 234 is being used to capture the soil sample.

As shown in FIG. 6, the UAV 200 may also include an actuator 236 provided in operative association with the soil sampling device 234. In such an embodiment, the controller 202 may be configured to control the operation of the actuator 236 such that the soil sampling device 234 is actuated relative to the surface 106 of the field 102 when the UAV 200 is in the landed condition. In another embodiment, the soil sampling device 234 may be fixed in place, with the sample being taken as the UAV 200 lands. The controller 202 may also control the operation of the UAV 200 such that the UAV 200 takes off from the data collection point 104, is flown to a desired location, and delivers the soil sample. The desired location may, for example, be a testing location, a vehicle, or any other suitable location (e.g., the base station 108 described above with reference to FIG. 1).

Figure 7:
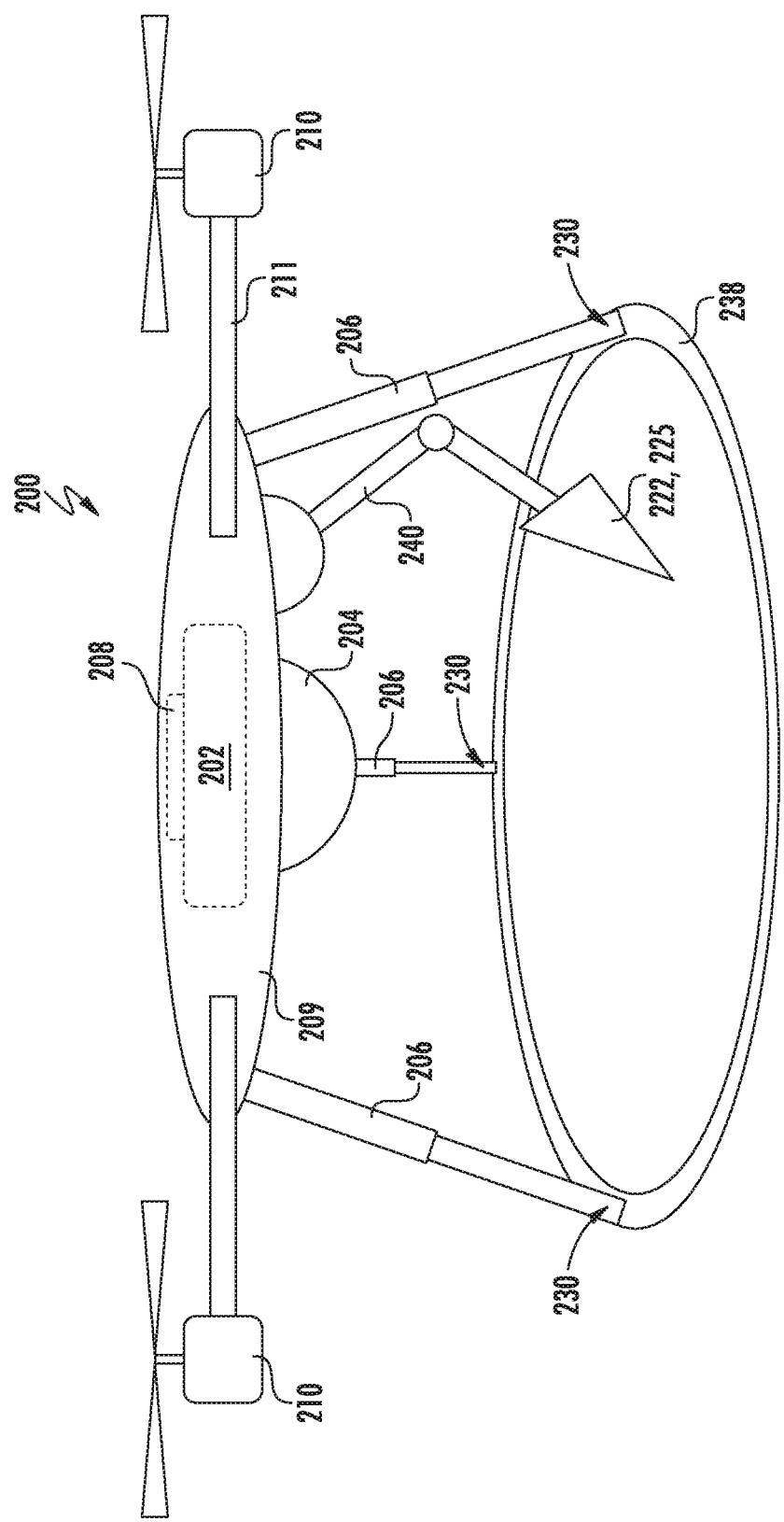
FIG. 7 illustrates an example view of one embodiment of a UAV including a deployable anchor for anchoring the UAV at a data collection point within a field in accordance with aspects of the present subject matter.

Referring now to FIG. 7, an alternative embodiment of the UAV 200 described above is illustrated in accordance with aspects of the present subject matter. As shown, the distal ends 230 of the support elements 206 are coupled to a landing ring 238. In such an embodiment, the landing ring 238 may be brought into contact with the surface 106 as the UAV 200 is being landed relative to the field 102. Additionally, similar to the embodiments described above, the controller 202 may use information from the level sensor 208 to actuate at least one of the support elements 206 to establish the UAV 200 in a level orientation.

Moreover, in contrast to the rotatable anchoring devices 223 described above, the embodiment of the UAV 200 shown in FIG. 7 includes a deployable anchoring device 225. In general, the deployable anchoring device 225 may be supported by the UAV 200 so as to be deployed in a direction away from the UAV body 209 towards the surface 106 to allow the deployable anchoring device 225 to be penetrated through the surface 106 in order to anchor the UAV 200 relative to the field 102. In one embodiment, the deployable anchoring device 225 may be coupled to an anchoring support arm 240, which may, in turn be coupled to the UAV body 209. The support arm 240 may be in a first or retracted position while the UAV 200 is in flight. Upon landing, the controller 202 may, in one embodiment, release the support arm 240, wherein the support arm 240 may swing through an arc until the deployable anchoring device 225 penetrates the surface 106. For example, the deployable anchoring device 225 may have a plurality of flukes, similar to a plow or boat anchor. These flukes may be driven into the surface 106 by kinetic energy as the deployable anchoring device 225 swings through the arc. In another embodiment, the deployable anchoring device 225 may be a gripping device, such as a hook or a claw, which may be lowered until the surface 106 is penetrated by the anchoring device 225. In yet another embodiment, the deployable anchoring device 225 may be an auger, which may be brought into contact with the surface 106 by the support arm 240, so as to enable the deployable anchoring device 225 to auger into the surface 106 and anchor the UAV 200. It should be appreciated that the support arm 240 is not limited to a rigid support arm and may include a plurality of joints or may be a cable, which may lower the anchoring device 222 to the surface 106.

Figure 8:
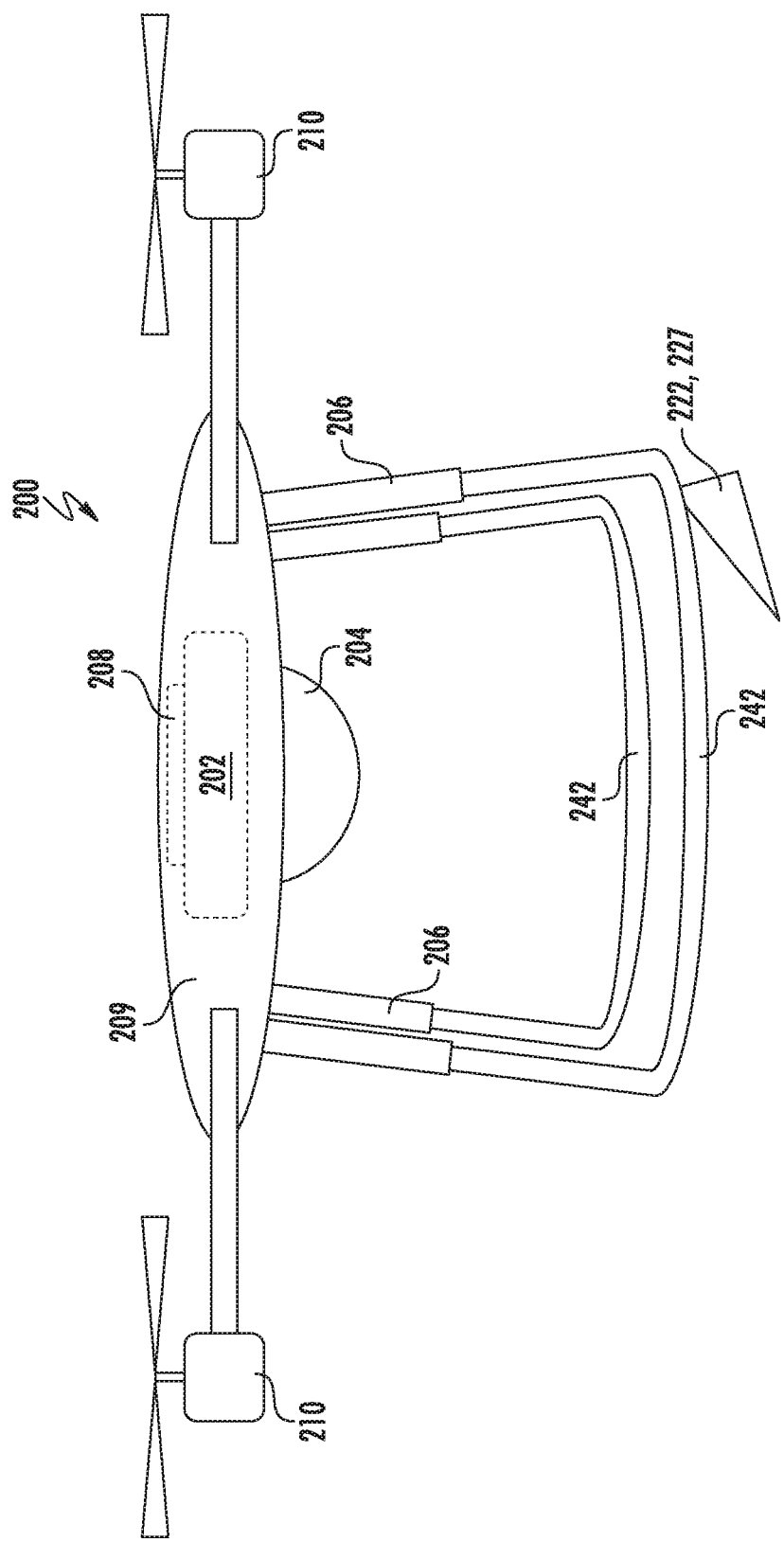
FIG. 8 illustrates an example view of an embodiment of a UAV equipped with a fixed anchoring device for anchoring the UAV at a data collection point within a field in accordance with aspects of the present subject matter.

Referring now to FIG. 8, another alternative embodiment of the UAV 200 described above is illustrated in accordance with aspects of the present subject matter. As shown in FIG. 8, the support elements 206 may be configured with a plurality of skids 242. The utilization of skids 242 may enable the controller 202 direct the UAV 200 to employ landing profiles other than strictly vertical. In addition, as opposed to the actuatable or deployable anchoring devices 222, 225 described above, the UAV 200 depicted in the embodiment shown in FIG. 8 is equipped with a fixed anchoring device 227. The anchoring device 227, being in a fixed configuration, may be oriented so as to be driven through the surface 106 as the UAV 200 is moved towards the surface 106 into the landed condition. The utilization of the fixed anchoring device 227 in combination with the plurality of skids 242 may allow, for example, the UAV 200 to be landed at a non-vertical angle relative to the field 102 while simultaneously anchoring the UAV 200 to the field 102.

Figure 9:
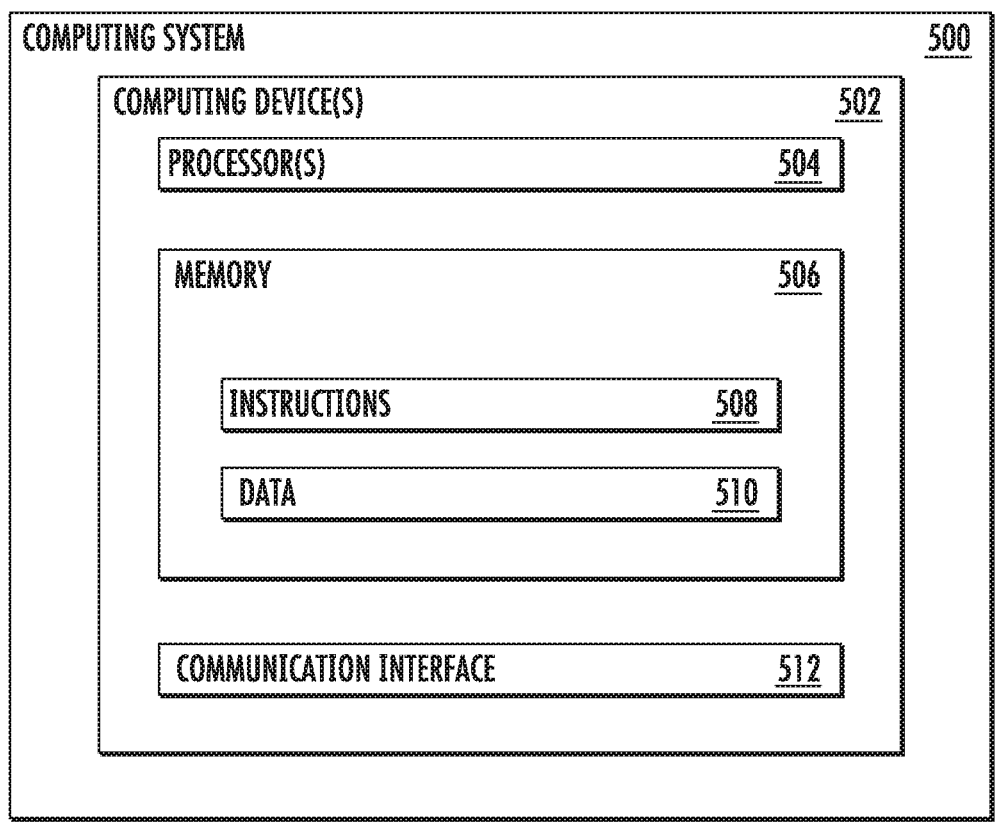
FIG. 9 illustrates a schematic view of one embodiment of an exemplary computing system suitable for use as one or more of the controllers or computing devices described herein in accordance with aspects of the present subject matter.

Referring now to FIG. 9, a block diagram of an example computing system 500 that may be used to implement aspects of the methods and/or systems described herein is illustrated in accordance with aspects of the present subject matter. In several embodiments, the computing system 500 may correspond to or form part of the UAV controller 202. In addition, the computing system 500 described with reference to FIG. 9 may also be illustrative of the configuration of one or more of the remote computing devices 400 described above with reference to FIG. 1. As shown, the computing system 500 may include one or more computing device(s) 502. The one or more computing device(s) 502 may include one or more processor(s) 504 and one or more memory device(s) 506. The processor(s) 504 may include any suitable processing device, such as a microprocessor, microcontroller, integrated circuit, logic device, or other suitable processing device. The memory device(s) 506 may include one or more computer-readable media, including, but not limited to, non-transitory computer-readable media, RAM, ROM, hard drives, flash drives, or other memory devices.

The memory device(s) 506 may store information accessible by the processor(s) 504, including computer-readable instructions 508 that may be executed by processor(s) 504. The instructions 508 may be any set of instructions that when executed by the processor(s) 504, cause the processor(s) 504 to perform operations. The instructions 508 may be software written in any suitable programming language or may be implemented in hardware. In some embodiments, the instructions 508 may be executed by the processor(s) 504 to cause the processor(s) 504 to perform suitable processes for operating a UAV relative to a field, or for implementing any of the other processes described herein.

The memory device(s) 504 may further store data 510 that may be accessed by the processor(s) 504. For example, the data 510 may include data associated with the data collection points 104, one or more field conditions, base station locations, and/or anchoring instructions as described herein. The data 510 may include one or more table(s), function(s), algorithm(s), model(s), equation(s), etc. according to example embodiments of the present subject matter.

The computing device(s) 502 may also include a communication interface 512 used to communicate, for example, with the other components of system. For instance, when the computing system 500 corresponds to or forms part of the UAV controller 202, the communication interface 512 may, for example, allow the UAV controller 202 to communicative with one or more of the remote computing devices 400, such as via a wireless connection. The communication interface 512 may include any suitable components for interfacing with one or more network(s), including for example, transmitters, receivers, ports, controllers, antennas, or other suitable components.

Figure 10:
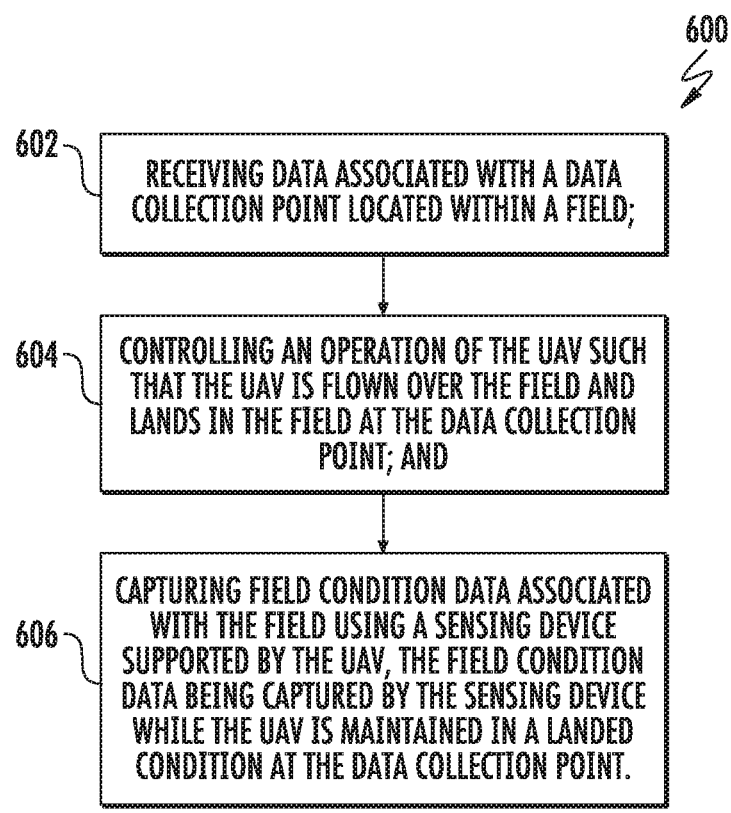
FIG. 10 illustrates a flow diagram of one embodiment of a method for acquiring agricultural data using a UAV in accordance with aspects of the present subject matter.

Referring now to FIG. 10, a flow diagram of one embodiment of a method 600 for acquiring agricultural data using a UAV is illustrated in accordance with aspects of the present subject matter. In general, the method 600 will be described herein with reference to the system 100 described above with reference to FIG. 1. However, it should be appreciated by those of ordinary skill in the art that the disclosed method 600 may be implemented within any other system having any other suitable system configuration. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 10, at (602), the method 600 includes receiving data associated with a data collection point located within a field. For example, as indicated above, the UAV controller 202 may be configured to receive data associated with one or more data collection points 104 (e.g., data associated with the location(s) of the point(s) 104 and/or data associated with the information to be collected at such point(s)) from one or more sources, such as one or more of the remote computing devices 400.

Additionally, at (604), the method 600 includes controlling an operation of the UAV such that the UAV is flown over the field and lands in the field at the data collection point. For example, as indicated above, the UAV controller 202 may be configured to control the operation of the UAV 200 such that the UAV 200 traverses over the field and lands at a given data collection point 104.

Moreover, at (606), the method 600 includes capturing field condition data associated with the field using a sensing device supported by the UAV. For instance, as indicated above, the UAV 200 may include or be provided in operative association with one or more sensing devices 204, such as one or more non-contact-based sensors, one or more contact-based sensors, and/or the like. In such an embodiment, the sensing device(s) 204 may be used to capture field condition data while the UAV 200 is maintained in a landed condition at the data collection point 104.

Figure 11:
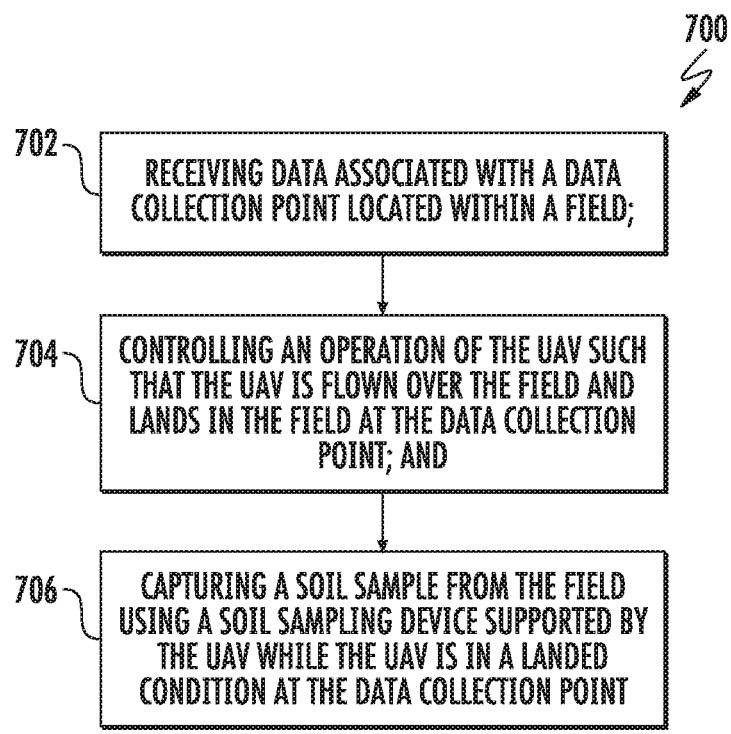
FIG. 11 illustrates a flow diagram of another embodiment of a method for acquiring agricultural data using a UAV in accordance with aspects of the present subject matter.

Referring now to FIG. 11, a flow diagram of one embodiment of a method 700 for acquiring agricultural data using a UAV is illustrated in accordance with aspects of the present subject matter. In general, the method 700 will be described herein with reference to the system 100 described above with reference to FIG. 1. However, it should be appreciated by those of ordinary skill in the art that the disclosed method 700 may be implemented within any other system having any other suitable system configuration. In addition, although FIG. 11 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 11, at (702), the method 700 includes receiving data associated with a data collection point located within a field. For example, as indicated above, the UAV controller 202 may be configured to receive data associated with one or more data collection points 104 (e.g., data associated with the location(s) of the point(s) 104 and/or data associated with the information to be collected at such point(s)) from one or more sources, such as one or more of the remote computing devices 400.

Additionally, at (704), the method 700 includes controlling an operation of the UAV such that the UAV is flown over the field and lands in the field at the data collection point. For example, as indicated above, the UAV controller 202 may be configured to control the operation of the UAV 200 such that the UAV 200 traverses over the field and lands at a given data collection point 104.

Moreover, at (706), the method 700 includes capturing a soil sample from the field using a soil sampling device supported by the UAV while the UAV is in a landed condition at the data collection point. For instance, as indicated above, the UAV 200 may be equipped with a soil sampling device 234 captured to capture a soil sample. In such an embodiment, when landed at a given data collection point 104, the soil sampling device 234 may be used to acquire a soil sample, which may then be transported or delivered back to a desired location, such as a base station 108 for the UAV 200.

Figure 12:
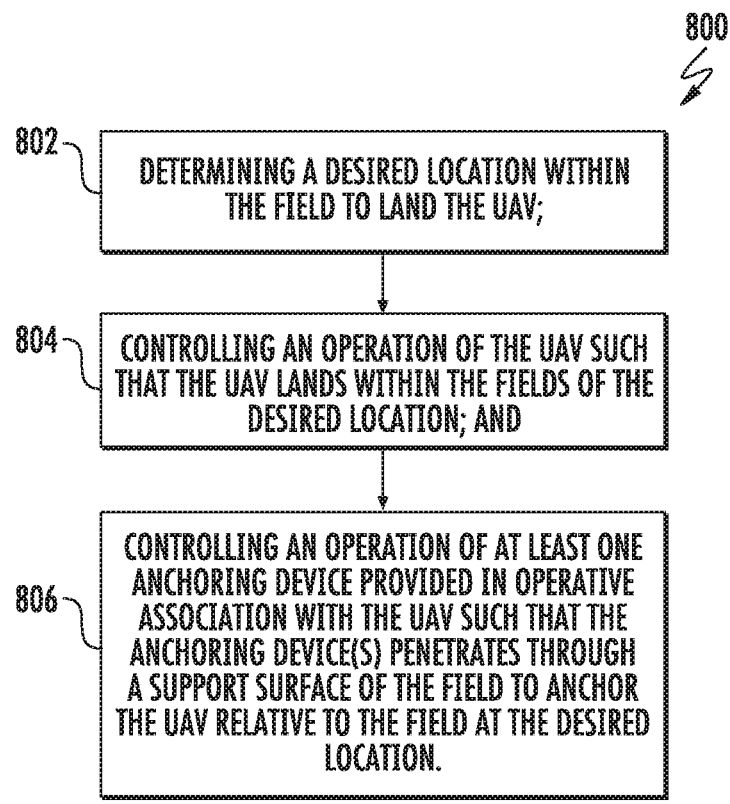
FIG. 12 illustrates a flow diagram of one embodiment of a method for operating a UAV relative to a field in accordance with aspects of the present subject matter.

Referring now to FIG. 12, a flow diagram of one embodiment of a method 800 for operating a UAV relative to a field is illustrated in accordance with aspects of the present subject matter. In general, the method 800 will be described herein with reference to the system 100 described above with reference to FIG. 1. However, it should be appreciated by those of ordinary skill in the art that the disclosed method 800 may be implemented within any other system having any other suitable system configuration. In addition, although FIG. 12 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 12, at (802), the method 800 includes determining a desired location within the field to land the UAV. For example, in one embodiment, the UAV controller 202 may be configured to determine a desired location to land the UAV 200 based on data received from one or more sources (e.g., one or more of the remote computing devices 400) that is associated with a data collection point 104 defined relative to the field.

Additionally, at (804), the method 800 includes controlling an operation of the UAV such that the UAV lands within the field at the desired location. For example, as indicated above, the UAV controller 202 may be configured to control the operation of the UAV 200 such that the UAV 200 traverses over the field and lands at a given location within the field.

Moreover, at (806), the method 800 includes controlling an operation of at least one anchoring device provided in operative association with the UAV such that the anchoring device(s) penetrates through a support surface of the field to anchor the UAV relative to the field at the desired location. For example, as indicated above, the UAV 200 may be provided with a suitable anchoring device (e.g., an actuatable anchoring device or a fixed anchoring device) that is configured to anchor the UAV 200 relative to the field, thereby, for example, allowing data to be captured more efficiently and/or effectively at the anchored location.

It is to be understood the steps of the methods 600, 700, and 800 are performed by the computing system 500 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any functionality performed by the computing system 500 described herein, such as the methods 600, 700, and 800, is implemented in software code or instructions which are tangibly stored on a tangible computer readable medium. The computing system 500 loads the software code or instructions via a direct interface with the computer readable medium or via a wired and/or wireless network. Upon loading and executing such software code or instructions by the computing system 500, the computing system 500 may perform any of the functionality of the computing system 500 described herein, including any steps of the methods 600, 700, and 800 described herein.

The term "software code" or "code" used herein refers to any instructions or set of instructions that influence the operation of the computer controller. They may exist in a computer-executable form, such as machine code, which is the set of instructions and data directly executed by a computer's central processing unit or by a controller, human-understandable form, such as source code, which may be compiled in order to be executed by a computer's central processing unit or by a controller, or in intermediate form, such as object code, which is produced by a compiler. As used herein, the term "software code" or "code" also includes any human-understandable computer instructions were set of instructions, e.g., a script that may be executed on the fly with the aid of an interpreter executed by a computer's central processing unit or by a controller.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed:

1. A system for acquiring agricultural data, the system comprising:
    an unmanned aerial vehicle (UAV) including a controller configured to control an operation of the UAV such that the UAV is moved relative to a field, the UAV further including a UAV body and a plurality of support elements extending outwardly from the UAV body, the plurality of support elements being configured to contact a surface of the field when the UAV is in a landed condition such that the plurality of support elements support the UAV body relative to the field;
    a contact-based, sensing device supported by the UAV, the contact-based sensing device comprising a soil probe configured to contact or penetrate through a surface of the field, the soil probe being configured to capture data associated with a field condition of the field based on detect variations in an electromagnetic characteristic as a voltage is supplied through a circuit associated with the soil probe;
    wherein the controller is configured to:
        receive data associated with a data collection point located within the field; and
        control the operation of the UAV such that the UAV is flown over the field and lands in the field at the data collection point;
    wherein the soil probe is configured to capture field condition data associated with the field while the UAV is maintained in the landed condition at the data collection point.

2. The system of claim 1, further comprising at least one anchoring device configured to penetrate through the surface of the field to anchor the UAV relative to the field as the soil probe is being used to capture the field condition data while the UAV is in the landed condition.

3. The system of claim 1, further comprising an actuator provided in operative association with the soil probe, the controller being configured to control an operation of the actuator such that the soil probe is actuated relative to the surface of the field when the UAV is in the landed condition.

4. The system of claim 1, further comprising a level sensor supported on UAV and communicatively coupled to the controller, the controller configured to actuate at least one of the plurality of support elements to adjust an orientation of the UAV relative to the surface of the field based on data received from the level sensor.

5. The system of claim 1, wherein the controller is further configured to transmit the field condition data to a remote computing device separate from the UAV.

6. The system of claim 1, wherein the plurality of support elements correspond to telescoping legs.

7. The system of claim 1, wherein the at least one of the plurality of support elements is configured to be actuated to adjust an orientation of the at least one of the plurality of support elements relative to the UAV body.

8. A system for acquiring agricultural data, the system comprising:
   an unmanned aerial vehicle (UAV) including a controller configured to control an operation of the UAV such that the UAV is moved relative to a field;
   a contact-based sensing device supported by the UAV, the contact-based sensing device comprising a soil penetrometer configured to capture data associated with a field condition of the field based at least in part on an amount of force exerted by the contact-based sensing device as the soil penetrometer penetrates through a surface of the field;
   at least one anchoring device configured to penetrate through the surface of the field to anchor the UAV relative to the field;
   wherein the controller is configured to:
      receive data associated with a data collection point, located within the field;
      control the operation of the UAV such that the UVA is flown over the field and lands in the field at the data collection point; and
      control an operation of the soil penetrometer such that field condition data is captured while the UAV is in a landed condition at the data collection point;
   wherein the at least one anchoring device is configured to anchor the UAV relative to the field while the UAV is in the landed condition and as the soil penetrometer is being used to capture the field condition data.

9. The system of claim 8, further comprising an actuator provided in operative association with the soil penetrometer, the controller being configured to control an operation of the actuator such that the soil penetrometer sampling device is actuated relative to the surface of the field when the UAV is in the landed condition.

10. The system of claim 8, wherein the controller is further configured to control the operation of the UAV such that the UAV takes off from the data collection point and is flown to a desired location for delivering the soil sample.

11. The system of claim 8, further comprising a rotational actuator operatively coupled to the at least one anchoring device, the rotational actuator configured to rotationally drive the at least one anchoring device such that the at least one anchoring device penetrates the surface of the field while the UAV is in the landed condition.

* * * * *